(12) United States Patent
Kim et al.

(10) Patent No.: US 7,393,713 B2
(45) Date of Patent: Jul. 1, 2008

(54) METHOD OF FABRICATING NEAR FIELD OPTICAL PROBE

(75) Inventors: Eun Kyoung Kim, Daejeon-shi (KR); Sung Q Lee, Daejeon-shi (KR); Ki Bong Song, Daejeon-shi (KR); Kang Ho Park, Daejeon-shi (KR)

(73) Assignee: Electronics and Telecomunications Research Institute, Daejeon-shi (KR)

( * ) Notice: Subject to any disclaimer, the term of this patent is extended or adjusted under 35 U.S.C. 154(b) by 373 days.

(21) Appl. No.: 11/020,180

(22) Filed: Dec. 27, 2004

(65) Prior Publication Data
US 2005/0230345 A1    Oct. 20, 2005

(30) Foreign Application Priority Data
Apr. 20, 2004    (KR) .................... 10-2004-0026951

(51) Int. Cl.
*H01L 21/00*    (2006.01)
(52) U.S. Cl. .................... 438/52; 257/E27.006
(58) Field of Classification Search ............ 438/31, 438/787, 906, 16, 52; 257/414, E27.006; 250/306
See application file for complete search history.

(56) References Cited
U.S. PATENT DOCUMENTS
5,811,017 A * 9/1998 Matsuyama .................. 216/11
6,201,226 B1 3/2001 Shimada et al.
6,886,395 B2 * 5/2005 Minne .................... 73/105

FOREIGN PATENT DOCUMENTS
JP    08313541    11/1996
JP    11271347    10/1999

OTHER PUBLICATIONS

S.S. Choi, et al.; "Fabrication of Subwavelength-Size Aperture for a Near-Field Optical Probe Using Various Microfabrication Procedures"; J. Vac. Sci. Technol. B 21(1) Jan./Feb. 2003; pp. 118-122; American Vacuum Society.
Ki-Bong Song, et al.; "Fabrication of a High-Throughput Cantilever-Style Aperture Tip by the Use of the Bird's Beak Effect"; Japan. Journal of Applied1 Physics., vol. 42 (2003) pp. 4353-5356, Part 1, No. 7A, Jul. 2003.

(Continued)

*Primary Examiner*—Quoc Hoang
(74) *Attorney, Agent, or Firm*—Lowe Hauptman Ham & Berner LLP

(57) ABSTRACT

Provided is a method of fabricating a near-field optical probe adapted to a near-field scanning optical microscopy and a near-field information storage device, in which a cantilever and an optical tip are provided in one body and the optical tip is arranged to face the upper portion of the substrate. High-concentrated boron ions are implanted into an uppermost silicon layer of a silicon on insulator (SOI) substrate, and a silicon layer into which boron ions are implanted while the silicon inside the tip is etched to form the hole to act as an etch stop layer, thereby easily removing the silicon inside the tip even with the cantilever exposed, and simplifying the process due to the simultaneous fabrication of the cantilever and the tip.

13 Claims, 6 Drawing Sheets

OTHER PUBLICATIONS

Chunchieh Huang, et al.; "Fabrication of Ultrathin $p^{++}$Silicon Microstructures Using Ion Implantation and Boron Etch-Stop"; Journal of Microelectromechanical Systems, vol. 10, No. 4, Dec. 2001.

P. Grabiec, et al., "SNOW/AFM Microprobe Integrated with Piezoresistive Cantilever Beam for Multifunctional Surface Analysis"; Microelectric Engineering 61-62 (2002) 971-986.

Nobuo Satoh, et al.; "Investigations of Local Properties by SNOW Combined with KFM Using a PZT Cantilever"; IEICE Trans. Electron., vol. e85-C, No. 12, Dec. 2002.

Gregor Schurmann, et al.; "Fabrication and Characterization of a Silicon Cantilever Probe with a an Integrated Quart-Glass (Fused-Silica) Tip for Scanning Near-Field Optical Microscopy"; Applied Optics, vol. 40, No. 28, Oct. 1, 2001.

Official Action for Japanese counterpart app. 2004-357138.

Ki-Bong Song et al.; "Fabrication of a High-Throughput Cantilever-Style Aperture Tip by the Use of the Bird's-Beak Effect"; The Japan Society of Applied Physics; Jul. 2003; vol. 42; pp. 4353-4356.

* cited by examiner

METHOD OF FABRICATING NEAR FIELD OPTICAL PROBE

CROSS-REFERENCE TO RELATED APPLICATION

This application claims priority to and the benefit of Korean Patent Application No. 2004-26951, filed on Apr. 20, 2004, the disclosure of which is incorporated herein by reference in its entirety.

BACKGROUND

1. Field of the Invention

The present invention relates to a method of fabricating a near field optical probe employed to a near field scanning optical microscopy and near field information storage device and, more specifically, to a method of fabricating a near-field optical probe in which a cantilever and an optical tip are provided in one body and the optical tip is arranged to face the upper portion of the substrate.

2. Discussion of Related Art

After an atomic force microscopy was invented, a research has been widely conducted on applications of a scanning probe microscopy (SPM) capable of measuring optical, electrical, and magnetic characteristics of a sample in a nanometer resolution. The atomic force microscopy is supported by a cantilever and has a sharp tip of several nanometers. For a near-field scanning optical microscopy, the near-field light is output from the end of the tip made of a material transparent to the wavelength of the incident light to transmit the light, so that the optical characteristics of a sample can be checked through an interaction between the near-field light and the sample.

A cantilever-type near-field optical probe is mainly fabricated with the silicon substrate, and is classified into two structures according to a shape of the tip, i.e., a structure where the tip faces up in the direction perpendicular to the substrate and a structure where the tip faces down in the direction perpendicular to the substrate.

An example of a near-field optical probe having the structure where the tip faces down will now be described with reference to FIGS. 1A and 1B.

Referring to FIG. 1A, a groove in a reverse pyramid is formed on a silicon substrate 1 of the portion where a probe is to be formed, by using an anisotropic etching characteristic according to an orientation of the silicon, and then, a silicon oxide layer 2 and a metal layer 3 are formed all over the surface.

Referring to FIG. 1B, when a back side of the silicon substrate 1 is etched by using a predetermined mask until the metal layer 3 of the probe is exposed, a cantilever made of the thin silicon substrate 1 and a probe made of the silicon oxide layer 2 at the end of the cantilever are formed. Here, the silicon substrate 1 of the other end of the cantilever is not etched, thereby serving as a supporting frame. Next, the metal layer 3 is removed to form a hole 4 at the center of the probe, and a metal 5 is deposited at the backside of the cantilever and the probe to block light the transmission of light.

As another example, it is proposed that the optical tip is made of the silicon oxide layer, and the cantilever is made of the silicon nitride layer and the silicon oxide layer. [S. S. Choi et al., "Fabrication of subwavelength-size aperture for a near-field optical probe using various microfabrication procedures", J. Vac. Sci. Technol. B. Vol. 21(1), p.p. 118-122, 2003]. In this method, silicon inside the optical tip is first etched, and an oxide layer is deposited. Here, a thick silicon oxide layer is grown in (111) direction due to the difference of growth rate of the oxide layer based on the orientation of the silicon. By using the silicon oxide layer as a mask, the hole of the optical tip is fabricated through an anisotropic plasma etching and an isotropic etching using HF.

However, the near-field probes having the arrangement described above has a chance that the substrate supporting the cantilever and the sample may be collided when the cantilever is moved and the probe is close to the sample.

Further, the near-field probe having a face-up tip can be fabricated in two methods. One method is to couple the cantilever and the tip, fabricated on the different substrates, respectively [Yasuhiro Shimada et al., "Probe with tip having micro aperture for detecting or irradiating light, near-field optical microscope, recording/reproduction apparatus using the probe, and method of fabricating the probe", U.S. Pat. No. 6,201,226, 2001 Mar 13]. In this case, a process of arranging and aligning the tip and the cantilever is further required, which accompanies the difficulty in the process.

The other method is to fabricate the outer shape of the tip by etching the surface of the silicon substrate, and then, etch the backside of the silicon substrate to fabricate cantilever and remove the silicon inside the tip [P. Grabiec et al., "SNOM/AFM microprobe integrated with piezoresistive cantilever beam for multifunctional surface analysis", Microelectronic Engineering, Vol. 61-62, p.p. 981-986, 2002Jul. 9. ]. In case that the near-field probe is fabricated in this method, the substrate supporting the cantilever and the sample is not collided when the probe is close to the sample. However, there is a difficulty in etching the silicon inside the tip or boring the hole of the tip. In other words, though it is necessary to maintain a constant thickness of the substrate during the silicon process, there is a difficulty in proceeding the process since the backside of the tip should be patterned after the most portion of the backside of the substrate is removed to form the cantilever. Further, with a focused ion beam (FIB), the hole of tip can be accurately bored. However, in this case, the high-cost apparatus is required.

In case that the near-field optical probe is used in the optical information storage device, the optical recording is enabled only when the transmittance of the near-field light transmitted from the end of the probe is high. With respect to this, researches have been made on improvement of the transmittance by fabricating a parabolic-type tip end using a bird's beak [K. Song et al., "Fabrication of a high-throughput cantilever-style aperture tip by the use of the bird's beak effect", Jpn. J. Appl. Phys., Vol. 42, Part 1, No. 7A, p.p. 4353-4356, 2003 July. ].

Recently, a research was conducted over a method of fabricating the probe using an optical fiber. In the method, the optical fiber is dangled such that a width of an end of the optical fiber is several nanometers. Using an interaction between the end of the optical fiber and the sample to maintain the close distance, a microscopic optical characteristic of the sample is checked by measuring the interaction between the sample and the near-field light emitted from the end of the optical fiber. However, with the probe comprising the optical fiber, the arrangement of the probe is mechanically weak, and it is difficult to fabricate the multiple probes.

SUMMARY OF THE INVENTION

The present invention is directed to a near-field optical probe capable of analyzing a microscopic optical characteristic of a sample with a near-field scanning optical microscopy (NSOM) and recording high-density light into an optical information storage device.

The present invention is also directed to a near-field optical probe having an optical tip facing an upper face of the substrate to prevent collision with the sample.

One aspect of the present invention is to provide a method of fabricating a near-field optical probe comprising: forming a tip having a silicon pattern and an insulating layer covering the outer surface of the silicon pattern on a substrate where a lower silicon layer, an insulating layer, and an upper silicon layer are deposited; implanting ions into an exposed portion of the upper silicon layer; patterning the upper silicon layer to form a cantilever; removing an exposed portion of the insulating layer where the hole of the tip is to be formed such that a cantilever-type pattern remains; removing the exposed portion of the upper silicon layer to form the cantilever made of the insulating layer and the upper silicon layer; subsequently removing the lower silicon layer and the insulating layer at the bottom of the substrate corresponding to the top and the cantilever; and removing the silicon pattern inside the tip to form a hole of the tip.

Forming the tip may include forming a mask pattern on a substrate where the lower silicon layer, the insulating layer and the upper silicon layer are deposited; etching the exposed portion of the upper silicon layer by a predetermined thickness to form a cone-type silicon pattern below the mask pattern; and forming the insulating layer on the surface of the silicon pattern.

While in etching process to form the silicon pattern, an undercut may be provided below the mask pattern such that a width of an interface between the mask pattern and the silicon pattern is less than μm.

The insulating layer may be formed by oxidation of the surface of the silicon pattern, wherein the silicon pattern has a parabolic shape, and a width of an interface between the mask pattern and the silicon pattern is less than 100 nm.

The ion may be a boron ion, and the heat treatment is performed after the boron ions of more than $10^{20}$ ions/cm$^3$ are implanted.

When the silicon pattern inside the tip is removed, the upper silicon layer into which the ions are implanted is used as an etch stop layer.

The step of depositing material for blocking light transmission on the surface of the cantilever and the tip may be further included, and the material for blocking the light transmission may be metal.

BRIEF DESCRIPTION OF THE DRAWINGS

The above and other features of the present invention will be described in reference to certain exemplary embodiments thereof with reference to the attached drawings in which.

DETAILED DESCRIPTION OF PREFERRED EMBODIMENTS

Exemplary embodiments of the present invention will now be described more fully with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1A:
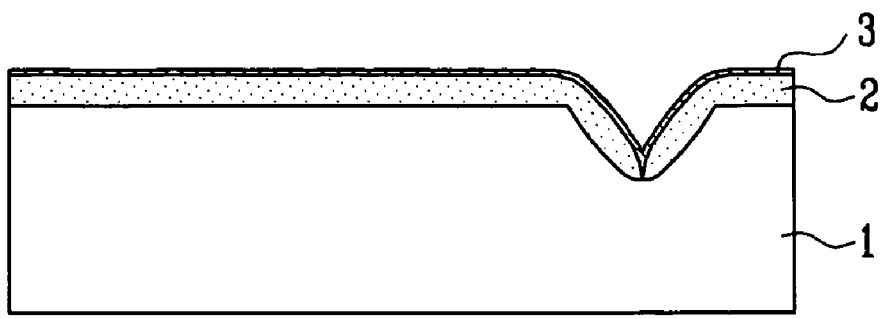
FIGS. 1A and 1B are diagrams for explaining a conventional method of fabricating the conventional near-field optical probe.
Figure 1B:
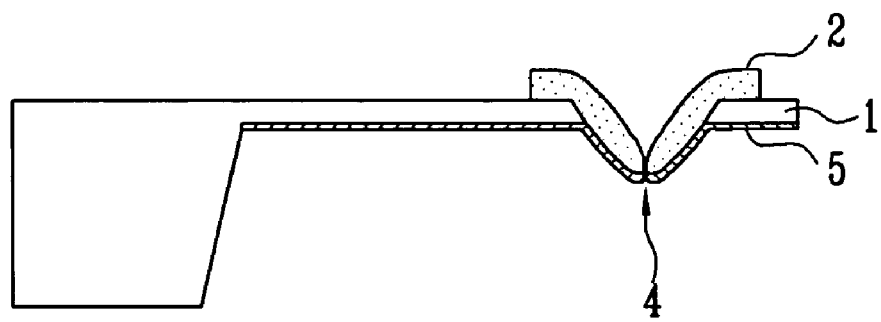
Figure 2A:
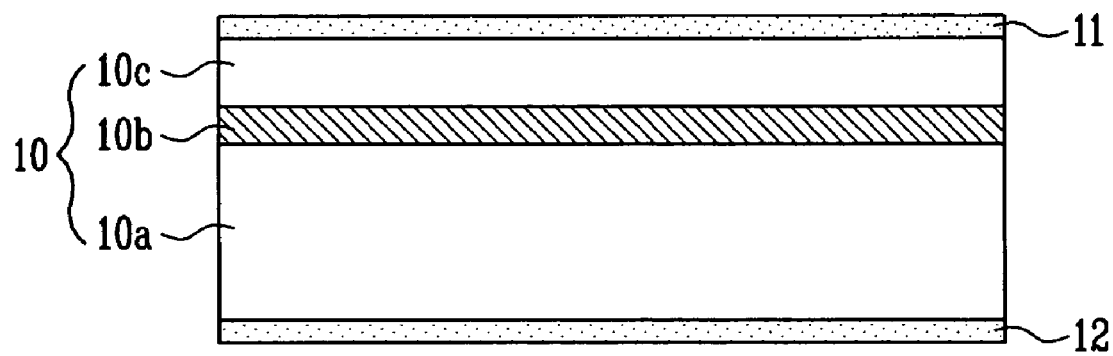
FIGS. 2A-2N are diagrams for explaining a method of fabricating the conventional near-field optical probe according to the present invention.
Figure 2B:
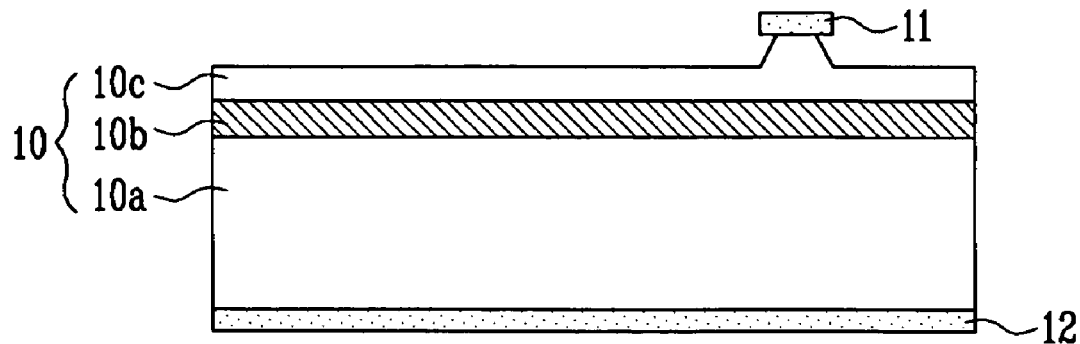
Figure 2C:
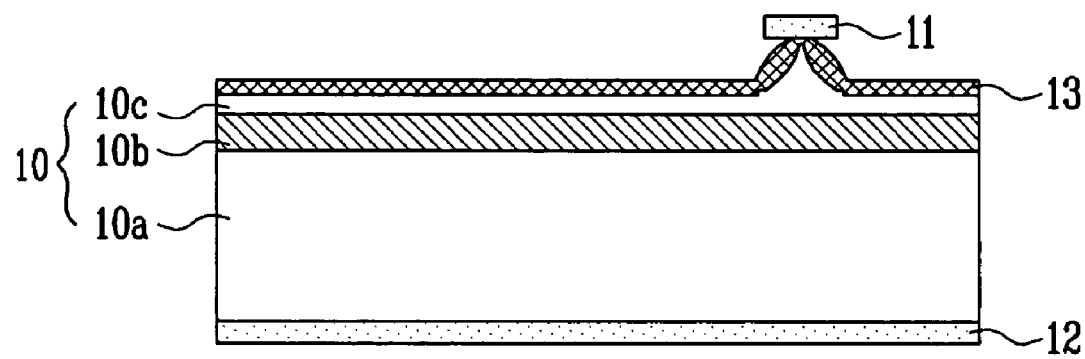
Figure 2D:
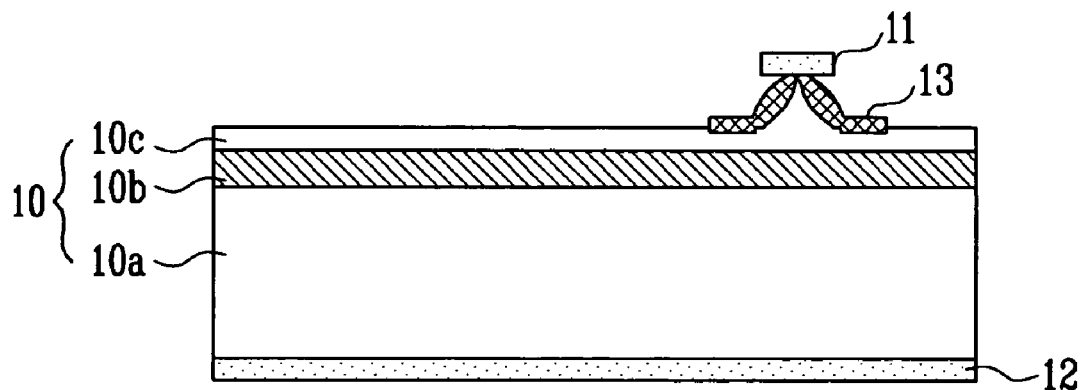
Figure 2E:
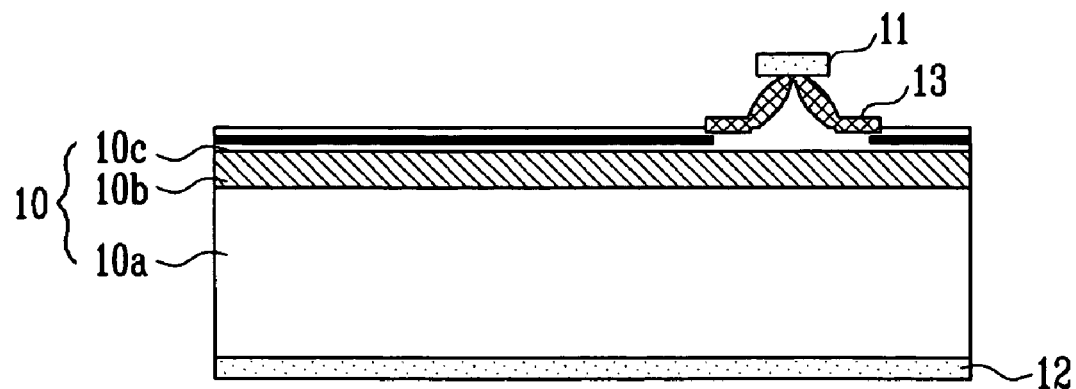
Figure 2F:
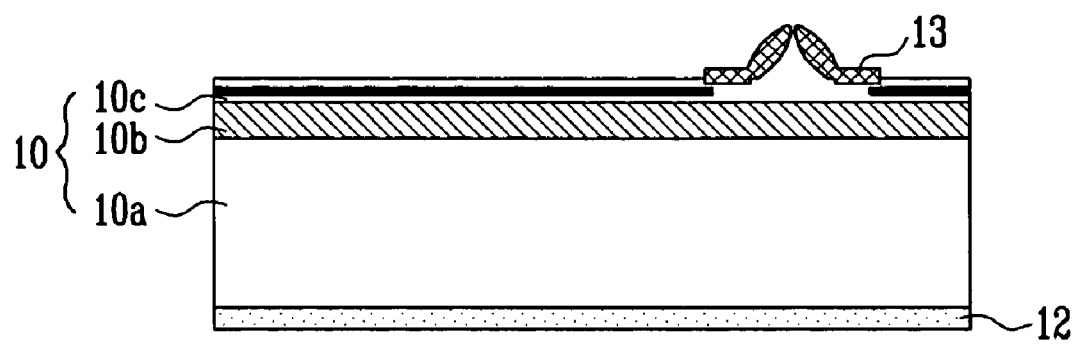
Figure 2G:
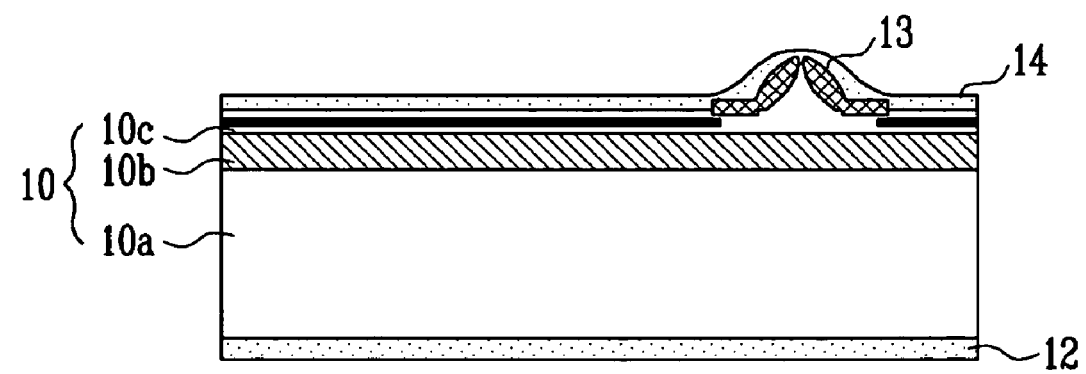
Figure 2H:
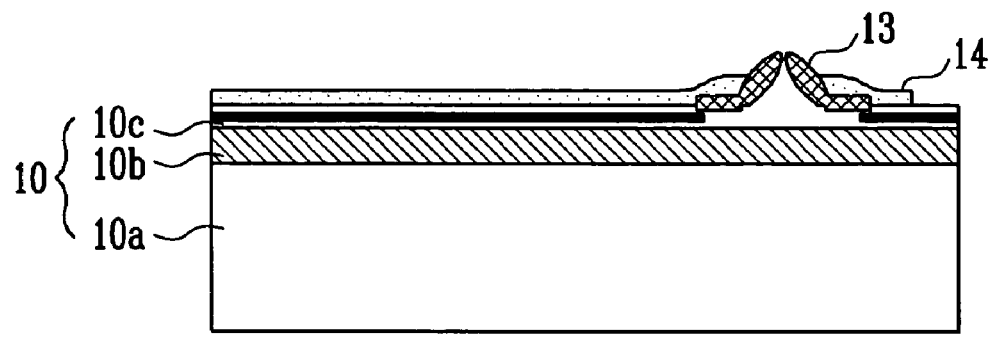
Figure 2I:
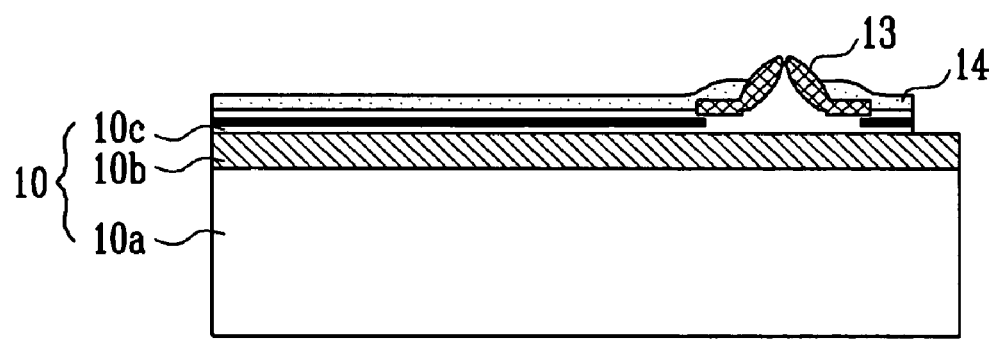
Figure 2J:
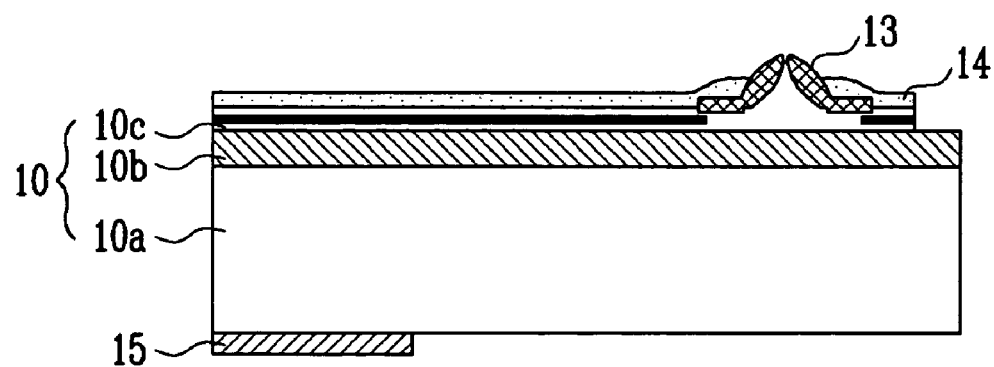
Figure 2K:
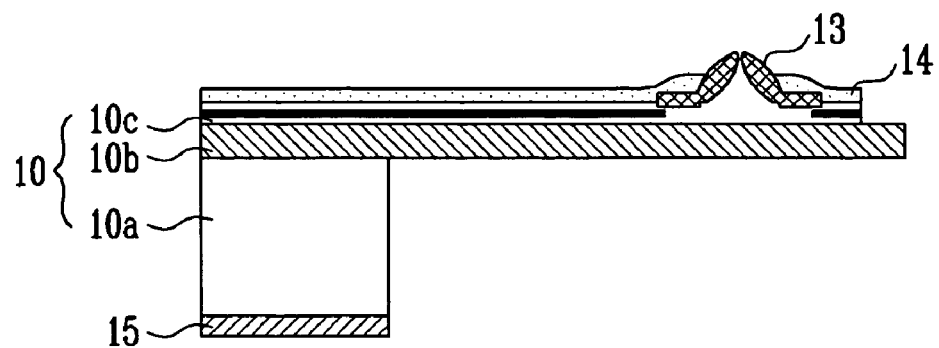
Figure 2L:
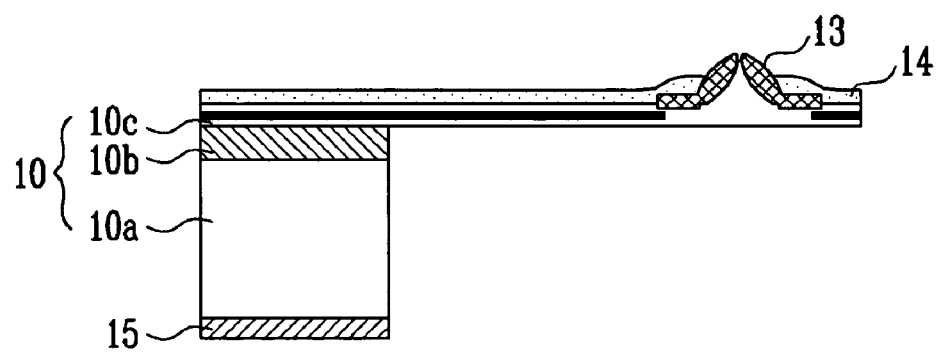
Figure 2M:
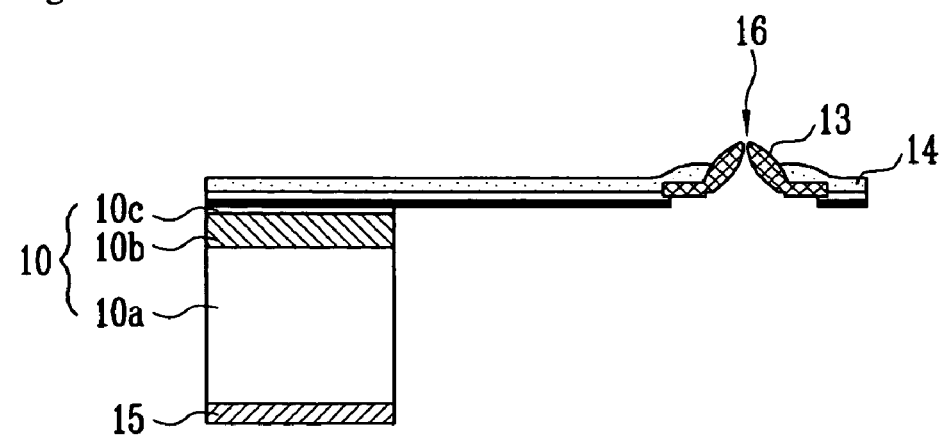
Figure 2N:
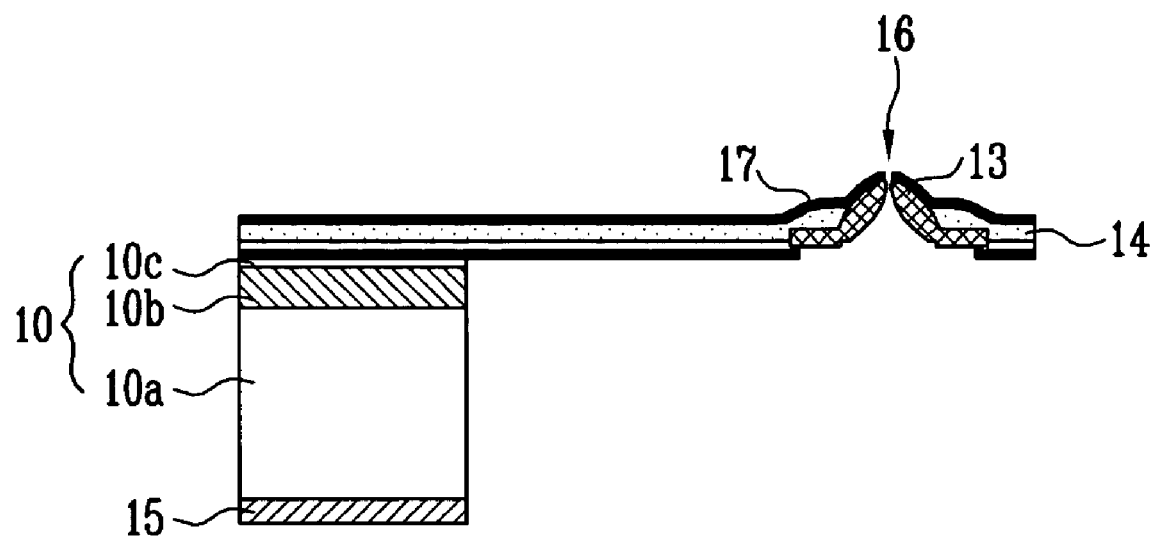

FIGS. 2A and 2N are diagrams for explaining a method of fabricating the conventional near-field optical probe according to an exemplary embodiment the present invention.

Referring to FIG. 2A, silicon nitride layers 11 and 12 are deposited in about 300 nm on both sides of the substrate 10 having silicon on insulator (SOI) by using a low pressure chemical vapor deposition (LPCVD) method.

The SOI substrate 10 comprises a lower silicon layer 10$a$, a silicon oxide layer 10$b$ and an upper silicon layer 10$c$, subsequently deposited.

Referring to FIG. 2B, using a mask for forming a tip, the silicon nitride layer 11 formed over the substrate 10 is patterned. Here, the silicon nitride layer 11 other than the portion where the tip is to be formed is etched with reactive ion etcher (RIE) or $H_3PO_4$.

The portion of the upper silicon layer 10$c$ exposed by the etching process using the patterned silicon layer 11 as a mask is etched by as much as a predetermined depth. Here, a width of the interface between the silicon nitride layer 11 and the upper silicon layer 10$c$ is adjusted to be μm or less such that an undercut is provided below the mask made of the silicon nitride layer 11. Preferably, the width of the interface between the silicon nitride layer 11 and the upper silicon layer 10$c$ is determined to be as much as the wavelength of the light used in the near-field scanning optical microscopy. For example, when the light having a wavelength of 650 nm, the width is determined to be 600 to 700 nm.

The etching process over the upper silicon layer 10$c$ for forming a tip below the mask of the silicon nitride layer 11 is performed by a wet etching process using HF/HNO$_3$/CH$_3$COOH mixed solution, KOH solution, and TMAH(Tetramethylammonium hydroxide) or by a deep-RIE (DRIE) process.

Referring to FIG. 2C, a silicon oxide layer 13 is grown on the surface of the upper silicon layer 10$c$ at a temperature range of 950 to 1000° C. by a predetermined thickness such that the outer surface of the tip has a parabolic shape. Here, the thickness of growth of the silicon oxide layer 13 is adjusted such that the portion where the hole of the tip is to be formed, i.e., the width of the upper silicon layer 10$c$ adjacent to the silicon nitride layer 11 is 100 nm or less. Since the resolution of the near-field scanning optical spectroscopy or the density of the optical information storage depends on the size of the hole, the width of the upper silicon layer 10$c$ adjacent to the silicon nitride layer 11 is preferably about 10 to 100 nm.

Referring to FIG. 2D, the silicon oxide layer 13 other than a portion of the silicon oxide layer 13 having a shape of the tip is removed by using HF solution.

Referring to FIG. 2E, high-concentrated boron ions of $10^{20}$ ions/cm$^3$ or more are implanted onto the exposed portion of the upper silicon layer 10$c$ by the predetermined depth and heat treatment is performed thereon. The heat treatment can be performed for 30 seconds at 1050° C. in case of rapid thermal treatment, and for 30 minutes at 1000° C. in case of normal thermal treatment.

Although different based on the etchant type, concentration, and the temperature thereof, when boron ions having a concentration of about $6 \times 10^{19}$ ions/cm$^3$ are implanted, an etch ratio is reduced by about 50%. Further, when boron ions having a concentration of about $10^{20}$ ions/cm$^3$ or more are implanted, the etch ratio is significantly reduced in the silicon etchant such as KOH. For example, at the concentration of $3 \times 10^{20}$ ions/cm$^3$, the etch ratio is reduced to 50% or less.

Therefore, in case that the height of the hole of the tip is designed to be 5 to 10 times as large as thickness of the cantilever, when the boron ions having a concentration of $1 \times 10^{20}$ ions/cm$^3$ to $3 \times 10^{20}$ ions/cm$^3$ is implanted, the hole of the tip may sufficiently serve as an etch stop layer. In addition, in case that 14N$^+$ ion is used, when the 14N$^+$ ions having a concentration of $10^{21}$ ions/cm$^3$ or more are implanted, the silicon is hardly etched in the ethylenediamine, water, pyrocatechol (EDP). Therefore, when the silicon is etched to form the hole of the tip, the portion of the upper silicon layer 10c where the high-concentrated ions are implanted serves as an etch stop layer, and the remaining upper silicon layer 10c which is not etched forms the cantilever.

Referring to FIG. 2F, the silicon nitride layer 11 used as a mask is removed by using H$_3$PO$_4$.

Referring to FIG. 2G, a silicon nitride layer 14 having a low stress is deposited all over the surface. The silicon nitride layer 14 protects the surface of the upper silicon layer 10c, which is to be a cantilever, during the silicon etching process for forming the hole of the tip. In case that the protective layer such as the silicon nitride layer 14 is not deposited, the upper surface and the lower surface of the upper silicon layer 10c are simultaneously exposed to the etchant during the silicon etching process for forming the hole of the tip, so that the upper silicon layer 10c to be the cantilever becomes thinner.

Here, in case that the concentration of the ions implanted into the upper silicon layer 10c is sufficiently large to lead to a very high etch ratio, the process of forming the silicon nitride layer 14 may be omitted.

Referring to FIG. 2H, the silicon nitride layer 14 is patterned as a cantilever through photolithography and etching processes using a mask for fabricating the cantilever. Here, while etching the silicon nitride layer 14 with H$_3$PO$_4$, the portion of the silicon oxide layer 13 where the hole of the tip is to be formed is partially exposed to easily form the hole of the tip. During the removal process of the silicon nitride layer 14, the silicon nitride layer 12 below the substrate 10 is also removed.

Referring to FIG. 2I, with an etching process where the silicon nitride layer 14 patterned by the cantilever shape is used as a mask, the exposed portion of the upper silicon layer 10c is etched to form the cantilever made of the silicon nitride layer 14 and the upper silicon layer 10c.

Referring to FIG. 2J, a silicon oxide layer 15 is formed on the bottom surface of the lower silicon layer 10a of the substrate 10 in about 3 μm by using the PECVD method. With the photolithography and the etch processes using a predetermined mask, the silicon oxide layer 15 is patterned to align with the cantilever pattern. Here, the silicon oxide layer 15 is etched through the RIE method or HF solution.

Referring to FIG. 2K, with an etching process using the patterned silicon oxide layer 15 as a mask, the exposed portion of the lower silicon layer 10a is removed so that the silicon oxide layer 10b below the tip and the cantilever is exposed. Here, the portion of the lower silicon layer 10a is not removed by the mask of the silicon oxide layer 15 to support the cantilever. The etching process may employ DRIE method, or an anisotropic etchant solution such as KOH, TMAH, and EDP.

Referring to FIG. 2l, with an etching process using the silicon oxide layer 15 as a mask, the exposed portion of the silicon oxide layer 10b is removed. By removing the silicon oxide layer 10 b, the lower portion of the tip and the cantilever is exposed. The etching process is performed through RIE method or HF solution.

Referring to FIG. 2M, the upper silicon layer 10c inside the tip is etched by using the KOH solution or ethylene diamine pyrocathecol (EDP). The portion of the upper silicon layer 10c exposed by the etchant is etched, and the exposed portion of the upper silicon layer 10c to be the cantilever has a slow etch rate when the high-concentrated boron ions serving as an etch stop layer during the etching process are implanted. Therefore, even when the upper silicon layer 10c constituting the cantilever is exposed, the upper silicon layer 10c inside the tip is totally etched to form a hole 16.

Referring to FIG. 2N, material 17 for blocking light transmission is deposited on the silicon nitride layer 14 having a shape of the tip in 100 nm thick or less. Al and Au, etc. may be used as the material 17 for blocking light transmission.

In addition, according to another embodiment of the present invention, on the substrate where a lower silicon layer, an insulating layer and an upper silicon layer are deposited, a tip made of a silicon pattern and an insulating layer covering the outer surface of the silicon pattern may be formed. After forming the tip on the substrate, ions are implanted into the upper silicon layer at a place to be exposed. An insulating layer is formed all over the surface and the insulating layer is patterned such that the portion of the insulating layer where the hole of the tip is to be formed is removed, and at the same time, the pattern of the cantilever shape remains. Further, the exposed portion of the upper silicon layer is removed to form the cantilever made of the insulating layer and the upper silicon layer. After subsequently removing the lower silicon layer and the insulating layer at the bottom surface of the surface corresponding to the tip and the cantilever, the silicon pattern inside the tip is removed to form the hole of the tip. In addition, material for blocking light transmission is deposited on the surface of the cantilever and the tip to complete the near-field optical probe.

Figure 3:
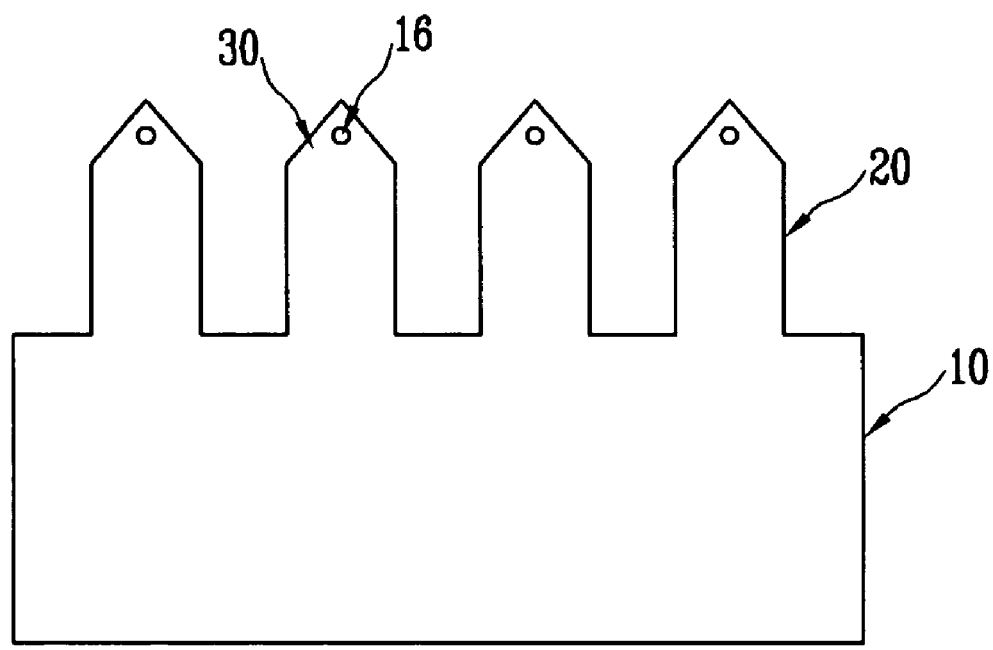
FIG. 3 is a plan view of a near-field optical probe array fabricated according to the present invention.

FIG. 3 is a plan view of a near-field optical probe array fabricated according to the present invention.

A plurality of cantilevers 20 supported by the substrate 10 are arranged in parallel at the one end, and tips 30 having holes 16 are formed at the other ends of the respective cantilevers 20.

The substrate has a lower silicon layer 10a, a silicon oxide layer 10b, and an upper silicon layer 10c, subsequently deposited. In addition, each of the cantilevers 20 has an ion-implanted upper silicon layer 10c and a silicon nitride layer 14, and the tip 30 is made of the silicon oxide layer 13 in a cone type having a slanted sidewall.

According to the present invention, with the typical silicon fabrication process, the near-field optical probe array shown in FIG. 3 can be easily fabricated. When the near-field optical probe is fabricated in an array type, an amount of data transmission per hour can be increased so that a low scanning rate can be compensated.

As described above, in the present invention, a cantilever and an optical tip are fabricated in one body, and a near-field optical probe in which the optical tip faces an upper surface of a substrate is fabricated, thereby having a rigid structure and preventing collision between the substrate and a sample when the probe is close to the surface of the sample.

In addition, a high-concentrated boron ions are implanted into the uppermost silicon layer of an SOI substrate, and while forming a hole by etching the silicon inside the tip, the boron-implanted silicon layer serves as an etch stop layer. Thus, even when the cantilever is exposed, the silicon inside the tip can be easily fabricated, and the tip and the cantilever can be fabricated at the same time, thereby simplifying the process.

According to the present invention, with the typical silicon process, an array-type probe having a wafer unit can be fabricated so that the array-type near-field optical probe where recording and playing data is improved can be implemented.

The near-field optical probe of the present invention can be adapted to a near-field scanning optical microscopy as well as a near-field information storage device.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A method of fabricating a near-field optical probe, comprising:
   forming a tip having a silicon pattern and an insulating layer covering the outer surface of the silicon pattern on a substrate where a lower silicon layer,
   an insulating layer, and an upper silicon layer are deposited;
   implanting ions into an exposed portion of the upper silicon layer;
   patterning the upper silicon layer to form a cantilever; subsequently removing the lower silicon layer and the insulating layer at the bottom of the substrate corresponding to the tip and the cantilever; and
   removing the silicon pattern inside the tip to form a near-field optical probe hole in the tip, and
   wherein, when the silicon pattern inside the tip is removed, the silicon layer into which the ions are implanted is used as an etch stop layer.

2. The method according to claim 1, wherein forming a tip comprises:
   forming a mask pattern on a substrate where the lower silicon layer, the insulating layer and the upper silicon layer are deposited; etching the exposed portion of the upper silicon layer by a predetermined thickness to form a cone-type silicon pattern below the mask pattern; and
   forming the insulating layer on the surface of the silicon pattern.

3. The method according to claim 2, wherein the mask pattern is made of a silicon nitride layer.

4. The method according to claim 2, wherein, while in etching process to form the silicon pattern, an undercut is provided below the mask pattern such that a width of an interface between the mask pattern and the silicon pattern is 600 to 700 nm.

5. The method according to claim 4, wherein the etching process is performed by a dry etching process using $HF/HNO_3/CH_3COOH$ mixed solution, KOH solution or TMAH solution, or a DRIE process.

6. The method according to claim 2, wherein the insulating layer is formed by oxidizing the surface of the silicon pattern, and the outer surface of the silicon pattern has a parabolic shape, and wherein the width of the interface between the mask pattern and the silicon pattern is grown to be 10 to 100 nm.

7. The method according to claim 6, wherein the oxidation process is performed at a temperature of 950 to 1000° C.

8. The method according to claim 1, wherein the ion is boron or $14N^+$, and a heat treatment process is performed after the ion implantation process.

9. The method according to claim 8, wherein the boron ion is implanted at a concentration of $6\times10^{19}$ ions/cm$^3$ to $3\times10^{20}$ ions/cm$^3$.

10. The method according to claim 1, wherein forming the cantilever comprises:
    forming an insulating layer over the entire upper surface, and then removing a portion of the insulating layer where a hole of the tip is to be formed such that a cantilever-type pattern remains; and
    removing the exposed portion of the upper silicon layer to form the cantilever made of the insulating layer and the upper silicon layer.

11. The method according to claim 1, wherein the silicon pattern inside the tip is removed using KOH, TMAH or EDP solution.

12. The method according to claim 1, further comprising depositing a material for blocking light transmission on the surface of the cantilever and the tip.

13. The method according to claim 12, wherein the material for blocking light transmission is metal.

* * * * *